April 9, 1929.  E. BRÜDERLIN  1,708,868
DEVICE FOR THE AIR TIGHT SOLDERING IN VACUO OF SHEET METAL BOXES
Filed Sept. 23, 1926
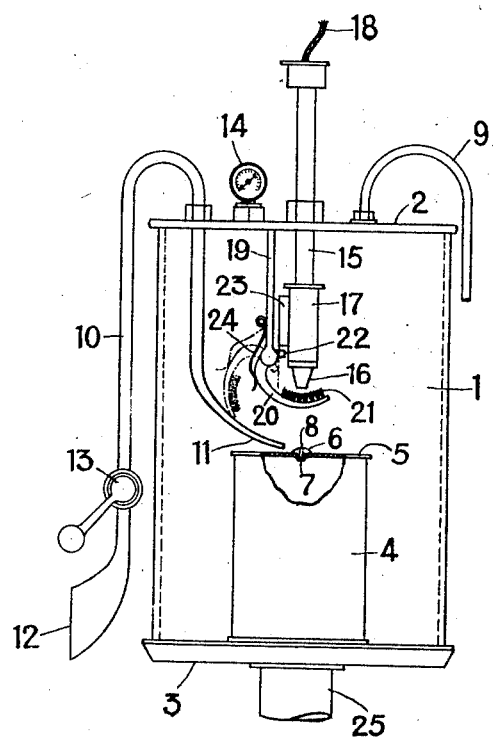
Inventor
Emil Brüderlin
by
Langner, Parry, Card + Langner
Att'ys.

Patented Apr. 9, 1929.

1,708,868

UNITED STATES PATENT OFFICE.

EMIL BRÜDERLIN, OF WABERN-BERN, SWITZERLAND.

DEVICE FOR THE AIR-TIGHT SOLDERING IN VACUO OF SHEET-METAL BOXES.

Application filed September 23, 1926. Serial No. 137,365.

This invention relates, firstly, to a method for the air-tight soldering in vacuo of sheet-metal boxes as well as, secondly, to a device for carrying this method into practice. The method consists, broadly, in providing the cover of the respective sheet-metal box with a drop of soldering metal, providing also a fine bore extending through that drop and the metal of the cover, inserting the thus prepared box into an air pump bell, or the like, through the top of which extends in air-tight manner a heatable and shiftable soldering copper which can be shifted so as to be brought into contact with said drop of soldering metal, making said bell and the metal box void of air by means of the air pump, and bringing the hot copper in contact with the said drop of soldering metal just at the said bore, whereby this bore is closed hermetically.

In the drawing, the sole figure represents a longitudinal sectional view of the device of the present invention.

In the drawing, 1 denotes a cylindrical glass vessel, 2 a cover affixed air-tight to the top of said vessel, 3 a shallow basin serving as the bottom for the cylinder 1 and being provided with any suitable tightening or packing material (not shown) by means of which the cylinder can be sealed at its lower edge. The cylinder is held immovable by any suitable means (not shown) and the bottom 3 is carried by a vertically movable rod or piston 25 which may be lifted and lowered, for instance hydraulically. The bottom 3 receives the sheet-metal box 4 to be made void of air and hermetically sealed. Prior thereto the lid 5 of the box has been provided with a drop 6 of soldering metal closing at first a small hole 7 in the lid and being provided itself with a fine bore 8 coinciding accurately with the hole 7.

The cover 2 is connected with a suction pipe 9 communicating at its other end with an air-pump (not shown) and with an air inlet pipe 10 extending inwardly into close proximity to the drop 6 of soldering metal where it terminates in the form of a nozzle 11 the arrangement of this nozzle relatively to said drop of metal being such that a current of air rushing into the vessel 1 through the tube 10 impinges directly upon the said drop. The outer leg of the tube 10 extends downwardly and its end is widened like a trumpet, and an automatically closing cock 13 is inserted into said leg. The tube 10 which forms an inverted U can be shifted vertically in the cover 2. Its inner leg passes through a stuffing box provided on the cover 2 so that no air can pass into the vessel 1 when the tube 10 is being shifted in said stuffing box.

14 denotes a vacuum gauge and 15 a soldering copper which is also shiftable in a stuffing box, and provided inside the vessel 1 with an electric heating coil 17. 18 denotes a strand of conducting wires passing through a longitudinal bore of the soldering copper 15 and being connected with the ends of the heating coil 17. The working end of the copper 15 is so shaped as to form an inverted truncated cone 16.

A rod 19 affixed to the cover 2 extends down into the vessel 1 near the copper 15, and carries at its lower end a double-armed lever 20, 22, which is held in a certain proper position by a spring 24 secured to the rod 19. The longer arm 20 of said lever is provided at its end with an upwardly directed brush 21 located just below the working end 16 of the copper, and the shorter arm 22 of the said lever is located below a ledge 23 by which the brush 21 is turned away from the member 16 when the rod 15 is being depressed. There is a certain small gap between the lever-arm 22 and the lower end of the ledge 23, as shown.

When the sheet-metal box 4 has been filled with the respective article of food, and has been closed air-tight by the lid 5, and when the hole 7 has been provided with the drop 6 of soldering metal and having the bore 8, the box is placed upon the bottom 3 which is located, at the time being, below the glass cylinder 1. The box is placed at the middle of the bottom 3 which thereafter is lifted by the rod or piston 25 until it contacts with the lower edge of said cylinder. The bottom is pressed firmly against said edge whereby the cylinder is sealed, and the cylinder is now exhausted by means of an air-pump by the intermediary of the pipe 9.

Now current is turned on so as to heat the soldering copper 15 by means of the coil 17; and then the copper is depressed. Its end piece 16 contacts with the brush 21 whereby it is cleansed, and the brush is drawn along over the end piece 16 by means of the ledge 23 and the lever-arm 22, as will be clear without a more detailed explanation. (See also the position of the brush drawn in dotted lines). The hot end piece 16 of the copper 15 then contacts with the drop 6 of soldering metal which is melted thereby so as to close airtight the holes 7 and bore 8 and thus sealing the sheet-metal box 4. Now the valve or cock 13 is opened so that atmospheric air rushes into the cylinder 1, the air current impinging through the nozzle 11 upon the soldering metal 6 and rendering it solid.

When the pressure inside the cylinder 1 is equal to that outside the same, the bottom 3 with the sealed box is lowered, the box removed, and another one substituted therefor, whereafter the cycle of operation described is repeated, and so on.

The spring 24 which had been put under tension when the lever 20, 22 had been turned by the ledge 23 (see position in dotted lines) turns said lever back into its former or initial position.

I claim.

1. A device for the solder-sealing of containers in vacuo comprising means forming a receiver to be evacuated, in which the container is adapted to be enclosed, a soldering iron reciprocably mounted through a wall of said receiver in a position to approach the point to be sealed, of said container, when reciprocated, a brush swingably mounted in said receiver in the path of said soldering iron, and cooperating means on said soldering iron and brush for moving the latter across the end of said soldering iron and out of the path thereof upon movement of said soldering iron toward the point to be sealed.

2. A device for solder-sealing of containers in vacuo, comprising means forming a receiver to be evacuated, in which the container is adapted to be enclosed, a soldering iron reciprocably mounted through a wall of said receiver in a position to approach the point to be sealed of said container, when reciprocated, a brush swingably mounted in said receiver in the path of said soldering iron, said soldering iron and brush cooperating when said soldering iron is moved toward the point to be sealed, for moving said brush across the end of said soldering iron and out of the path thereof, and a valved conduit adjustably mounted in a wall of said receiver for admitting air to relieve the vacuum in said receiver, said conduit having the discharge opening thereof directible toward said sealing point for quickly cooling the solder.

In testimony whereof I affix my signature.

EMIL BRÜDERLIN.